United States Patent
Kahrens et al.

(10) Patent No.: US 12,508,989 B2
(45) Date of Patent: Dec. 30, 2025

(54) APPARATUS FOR ATTACHING A REAR-VIEW MIRROR TO THE INTERIOR OF A TRANSPORTATION VEHICLE AND TRANSPORTATION VEHICLE

(71) Applicant: VOLKSWAGEN AKTIENGESELLSCHAFT, Wolfsburg (DE)

(72) Inventors: Dietmar Kahrens, Bergfeld (DE); Robin Rudat, Vechelde (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 28 days.

(21) Appl. No.: 18/609,055

(22) Filed: Mar. 19, 2024

(65) Prior Publication Data
US 2024/0326690 A1  Oct. 3, 2024

(30) Foreign Application Priority Data
Mar. 27, 2023  (DE) ...................... 10 2023 202 734.8

(51) Int. Cl.
B60R 1/04 (2006.01)
(52) U.S. Cl.
CPC ....................... B60R 1/04 (2013.01)
(58) Field of Classification Search
CPC ........................ B60R 1/04; B60R 2011/0033
See application file for complete search history.

(56) References Cited

U.S. PATENT DOCUMENTS

| | | | | |
|---|---|---|---|---|
| 7,726,623 | B2* | 6/2010 | Muller | B60R 1/04 248/475.1 |
| 8,925,891 | B2* | 1/2015 | Van Huis | B60R 1/04 248/548 |
| 11,040,663 | B2 | 6/2021 | Demaagd et al. | |
| 11,590,894 | B2* | 2/2023 | Kahrens | B60R 1/04 |
| 11,731,559 | B2 | 8/2023 | Sugimura | |
| 2013/0062497 | A1* | 3/2013 | Van Huis | B60R 1/04 248/479 |

(Continued)

FOREIGN PATENT DOCUMENTS

| | | |
|---|---|---|
| CN | 206719114 U | 12/2017 |
| DE | 7908776 U1 | 7/1979 |

(Continued)

*Primary Examiner* — Eret C Mcnichols
(74) *Attorney, Agent, or Firm* — BARNES & THORNBURG LLP

(57) ABSTRACT

An arrangement for fastening an interior rearview mirror to a transportation vehicle, wherein the interior review mirror has a mirror head and a mirror foot connected together and the mirror foot is releasably attached to a base plate fixed to the transportation vehicle. At least one elastically deformable first clamping element is held on the mirror foot on one side and on the base plate on the other side, and the first clamping element is releasable from the base plate and/or from the mirror foot by elastic deformation. A second clamping element is held on the mirror foot on one side and on the base plate on the other side, and the second clamping element is configured so the first clamping element is completely releasable from the mirror foot or from the base plate under elastic deformation of the first clamping element without release of the second clamping element.

8 Claims, 3 Drawing Sheets

(56) References Cited

U.S. PATENT DOCUMENTS

2014/0091123  A1      4/2014  Kim et al.
2014/0175250  A1 *    6/2014  Chieppa .................... B60R 1/04
                                                        248/475.1

FOREIGN PATENT DOCUMENTS

| DE | 10012971 A1      | 9/2001  |         |
|----|------------------|---------|---------|
| DE | 102017007379 A1 *| 2/2019  | ............... B60R 1/04 |
| DE | 212018000374 U1  | 7/2020  |         |
| DE | 102020005117 A1  | 10/2020 |         |
| DE | 112019000611 T5  | 10/2020 |         |
| DE | 102020003023 A1  | 11/2021 |         |
| EP | 0590111 B1       | 4/1997  |         |
| EP | 3684648 A1       | 7/2020  |         |
| KR | 20010065450 A    | 7/2001  |         |
| WO | 2014052658 A1    | 4/2014  |         |

* cited by examiner

APPARATUS FOR ATTACHING A REAR-VIEW MIRROR TO THE INTERIOR OF A TRANSPORTATION VEHICLE AND TRANSPORTATION VEHICLE

PRIORITY CLAIM

This patent application claims priority to German Patent Application No. 10 2023 202 734.8, filed 27 Mar. 2023, the disclosure of which is incorporated herein by reference in its entirety.

SUMMARY

Illustrative embodiments relate to an arrangement for fastening an interior rearview mirror to a transportation vehicle, wherein the interior review mirror has a mirror head and a mirror foot which are connected together, wherein the mirror foot is releasably attached to a base plate fixed to the transportation vehicle, wherein, for releasable attachment, at least one elastically deformable first clamping element is held on the mirror foot on one side and on the base plate on the other side, and wherein the first clamping element is releasable from the base plate and/or from the mirror foot by elastic deformation.

Illustrative embodiments further relate to a transportation vehicle with the above-described arrangement.

BRIEF DESCRIPTION OF THE DRAWINGS

The disclosed embodiments are explained in more detail below with reference to the drawing, in which.

DETAILED DESCRIPTION

Figure 1:
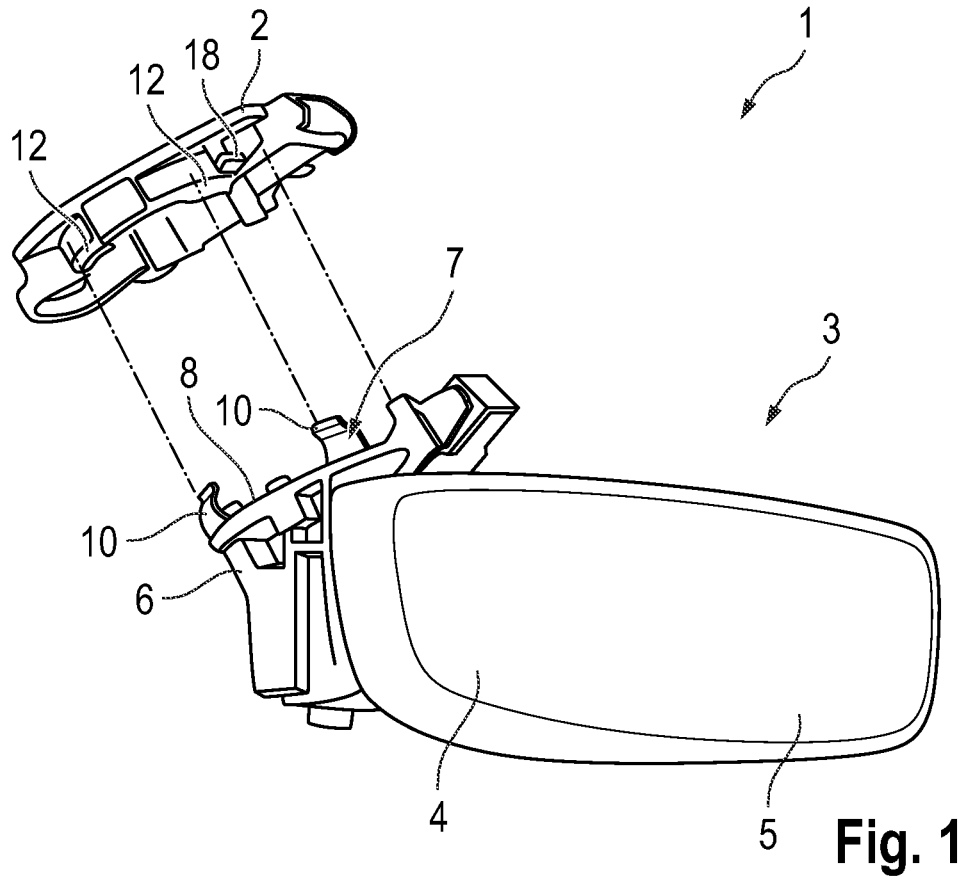
FIG. 1 shows a perspective, exploded illustration of an exemplary arrangement.

Arrangements of the type cited initially are known, for example, from patent specification EP 3 684 648 B1. Here a base plate is attached directly to a windscreen of a transportation vehicle and serves for carrying an interior rearview mirror. The latter has a mirror foot assigned to the base plate and a mirror head carrying a mirror element. The mirror head is pivotably mounted on the mirror foot. The mirror foot and base plate are connected together by a pivot joint and a clamping element. The clamping element is configured such that when a sufficiently high force is applied to the mirror head, it separates from the mirror foot or base plate and thereby allows a pivoting of the interior rearview mirror relative to the base plate. The risk of injury from the rearview mirror to occupants of the transportation vehicle is reduced because the interior review mirror can yield. At the same time, the pivot mounting prevents the interior review mirror from detaching completely from the base plate and possibly being flung through the vehicle interior as a detached component.

The disclosed embodiments provide an improved arrangement which firstly facilitates mounting and secondly allows movement of the interior review mirror relative to the base plate in further directions without allowing a complete separation of the interior rearview mirror from the base plate. The disclosed embodiment increase the moveability of the interior rearview mirror relative to the base plate by at least one further degree of freedom in comparison with the previously known solution.

This is achieved by an arrangement, wherein a second clamping element is held by form fit with play on the mirror foot on one side and on the base plate on the other side, wherein the second clamping element is configured such that the first clamping element is completely releasable from the mirror foot or from the base plate under elastic deformation of the first clamping element without release of the second clamping element. This is achieved, for example, in that the play is sufficiently great for the second clamping element only to grip or cause a locking of the mirror foot on the base plate when the first clamping element has been completely released. Alternatively or additionally, the second clamping element is formed elastically deformable at least in regions so that, even before the play is overcome by the elastic deformation of the second clamping element, a complete release of the first clamping element is possible. By simple and economic ways, the arrangement is thus improved such that the risk of injury to transportation vehicle occupants is further reduced and also simple installation and removal are possible.

According to an exemplary embodiment, the first clamping element has a first clamping plate, extending between the mirror foot and the base plate, on which one or more spring elements are arranged, wherein each spring element undercuts a respective latching protrusion of the mirror foot or the base plate by form fit without play. The base plate holds the respective spring element in a desired position, and in the case that the first clamping element has multiple spring elements, the spring elements are held together by the first clamping plate. Optionally, the multiple spring elements point in the same direction or protrude from the first clamping plate in the same direction, so that the spring elements are assigned either only to the mirror foot or only to the base plate. According to an exemplary embodiment, at least one of the spring elements is assigned to the mirror foot and at least one other of the spring elements is assigned to the base plate. In any case, the respective spring element undercuts the mirror foot or base plate by form fit without play, wherein the respective spring element may be preloaded in mounted state to guarantee the play-free mounting. This ensures that in normal cases, the interior rearview mirror is held firmly on the base plate and also, in driving mode, relative movements between the base plate and mirror foot, which could lead to rattling noises, are prevented.

According to a further exemplary embodiment, the first clamping plate is attached to the mirror foot or to the base plate. Thus the first clamping element is held by the clamping plate either on the base plate or on the mirror foot, and by the one or more spring elements on the mirror foot or on the base plate, i.e., on the respective other part. Optionally, the base plate is held on the mirror foot or on the base plate permanently or such that tool-free removal is not possible. For this, it is provided that the clamping plate is held on the mirror foot or base plate by screwing, clamping, gluing and/or welding.

Optionally, the multiple spring elements are distributed symmetrically or evenly over the periphery of the clamping plate, giving a mounting of the interior rearview mirror on the base plate which allows a moveability of the interior rearview mirror relative to the base plate in multiple directions with the same or almost the same force.

The second clamping element may have one or more hook elements which undercut a retaining protrusion of the mirror foot or the base plate by form fit with the above-mentioned play. As soon as the play has been overcome, the hook elements or the one hook element comes into form-fit contact with the mirror foot or base plate, which prevents further separation of the mirror foot from the base plate.

In particular, the hook elements are stiff in comparison with the spring elements, so that they cannot be released from the mirror foot or base plate by an elastic deformation thereof without tools.

It is furthermore provided that the second clamping element has a second clamping plate which extends between the base plate and mirror foot, and parallel to the first clamping plate, and has the hook element or elements on its outer periphery. The second clamping element is thus a component separate from the first clamping element, and is arranged between the mirror foot and base plate. In mounted state, the two clamping plates may, for example, lie on one another or be spaced apart from one another in normal operation. By forming the clamping elements as separate components, these may be optimized for their respective task with regard to their elasticity, for example. Thus optionally, different materials may be used for the two clamping elements.

The holding element or elements may be formed integrally with the second base plate. Optionally, the spring elements are also formed integrally with the first base plate. This gives two clamping elements which can be handled individually and easily arranged and mounted during installation.

According to an exemplary embodiment, the hook element or elements of the second clamping element may be arranged on the first clamping plate and formed integrally therewith. In this case, both the spring element(s) and also the hook element(s) are arranged on the first base plate. This gives a particularly compact component which acts between the mirror foot and base plate, which further reduces the mounting complexity. The production costs as a whole are thereby further reduced.

Optionally, as already stated, the second clamping element is formed elastically deformable in regions to allow the complete release of the first clamping element from the mirror foot or base plate without release of the second clamping element. The second clamping element may be formed elastically deformable only in regions, so that the hook elements are stiff. This is beneficial when the second clamping element has its own second clamping plate.

Also, it is provided that the second clamping plate has a higher elasticity than the hook elements. This ensures that, on loading of the interior rearview mirror, the second clamping plate is elastically deformable to allow movement of the interior rearview mirror relative to the base plate in different directions, whereby the relatively stiff design of the hook elements prevents a release of the interior rearview mirror from the base plate.

If the hook elements and spring elements are arranged on the first base plate and formed integrally therewith, the hook elements, because of their design may have a greater stiffness than the spring elements. For this, the hook elements, for example, have an L-shaped course with a right angle, and the spring elements have an at least partially curved, in particular, V-shaped course with portions running obliquely but not perpendicularly to one another, thus promoting automatic release by elastic deformation of the spring elements.

The disclosed transportation vehicle is distinguished by the disclosed arrangement. The above-mentioned benefits are thereby achieved.

FIG. 1 shows, in a perspective exploded illustration, an arrangement 1 for a transportation vehicle not shown in detail here. The arrangement 1 has a base plate 2 which can be attached, for example, glued, to a windscreen of the transportation vehicle. Furthermore, the arrangement 1 has an interior rearview mirror 3 which can be attached to the base plate 2. The interior rearview mirror 3 has a mirror head 4 which carries a mirror element 5, and a mirror foot 6 which can be connected to the base plate 2. The mirror head 4 is mounted on the mirror foot 6, wherein it can be articulated or movable, to be able to adapt the orientation of the mirror element 5 to the requirements of a user.

The arrangement 1 furthermore has a first clamping element 7. This clamping element is attached to the mirror foot 6 on its side facing the base plate 2. In particular, the clamping element 7 is screwed to the mirror foot 6. For this, the first clamping element 7 may have a clamping plate 8 which rests on the bottom or free end face of the mirror foot 6 and is screwed thereto. For this, as shown, for example, in FIG. 4, the clamping plate 8 has multiple passage openings 9 through which one or more fastening screws can be guided and screwed into the mirror foot 6. The mirror foot 6, for example, has threads or threaded studs let into the end face, onto which the fastening screws can be screwed.

The clamping element 7 has multiple spring elements 10 arranged on its outer periphery which protrude from the base plate 8 in the same direction, namely in the present exemplary embodiment in the direction of the base plate 2. The spring elements 10 are here formed integrally with the clamping plate 8. Each spring element 10 here has a portion protruding perpendicularly from the clamping plate 8, and adjoining this an oblique holding portion 11 which is thus oriented both obliquely relative to the perpendicular portion and also obliquely relative to the base plate 8, for example, at an angle of 45 degrees. The holding portions 11 point towards one another, i.e., are oriented extending inward.

For each spring element 10, the base plate 2 has a latching protrusion 12 as shown in FIG. 1. On installation, the mirror foot 6 with clamping element 7 attached thereto is pushed onto the base plate 2 such that the spring elements 11 are pushed back, initially outward under elastic deformation, by the respective latching protrusion 12 and then, because of their inherent elasticity, after passing the respective latching protrusion 12, snap back or undercut the respective latching protrusion 12 by form fit. The clamping element 7 is here configured such that in mounted state, the spring elements 11 lie elastically preloaded against the base plate 2, in particular, against the respective latching protrusion 12, so that a firm play-free connection of mirror foot 6 to base plate 2 is guaranteed. Thus, for example, rattling sounds are avoided in normal operation.

Because of the oblique holding portions 11, the spring elements 11 can however be released from the respective latching protrusion 12 without tools if a sufficiently high force acts on the mirror foot 6. Then the holding portions are pressed outward by the latching protrusions 12 because of their oblique course, and thereby separated from the base plate 2.

Figure 2:
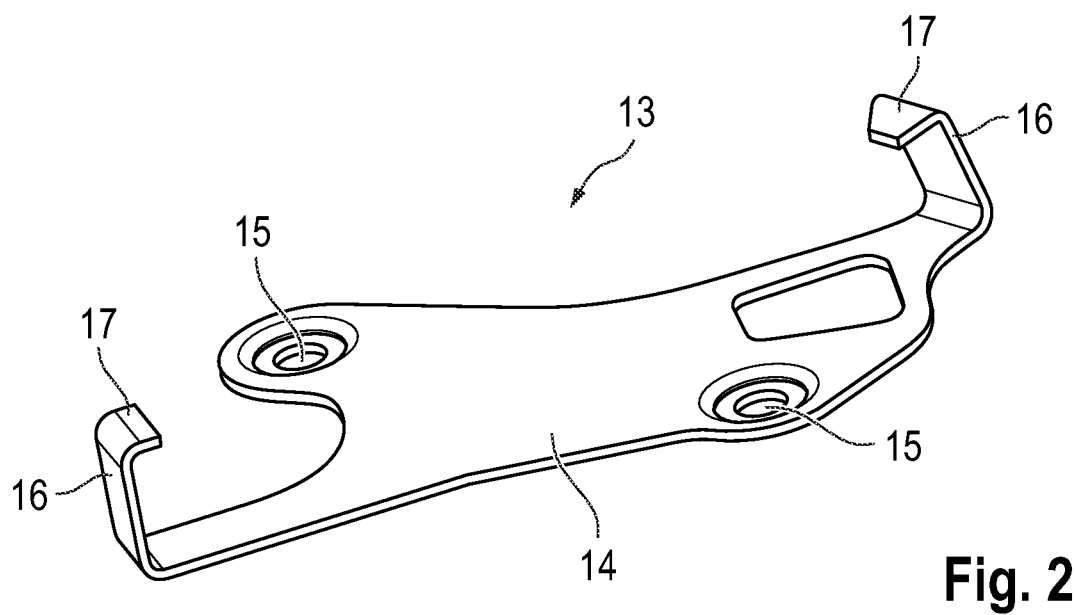
FIG. 2 shows a clamping element of the exemplary arrangement in a perspective individual illustration.

To prevent the mirror foot 6 being able to detach undesirably completely from the base plate 2, the arrangement 1 may have a second clamping element 13. FIG. 2 shows the second clamping element 13 in a perspective illustration. The second clamping element 13 has a second clamping plate 14 which also has one or more passage openings 15 for passage of fastening screws. In particular, the clamping plate 14 is configured so it can be laid on the clamping plate 8, wherein then at least two of the passage openings 15, 9 align with one another so that the two clamping plates 8 and 14 can be penetrated by one fastening screw and attached to the mirror foot 6. Optionally, at least two fastening screws are provided.

In mounted state, the clamping plate 14 thus extends between the mirror foot 6 and base plate 2 and may lie on the clamping plate 8. The clamping plate 14 has on its outer periphery two hook elements 16 which are diametrically opposite one another. The hook elements 16 each have a portion protruding at least substantially perpendicularly from the clamping plate 14, and a retaining portion 17 adjoining this at a right angle. Thus the hook elements 16 have an L-shaped course.

For each of the hook elements 16, the base plate 2 has a holding protrusion 18 which in mounted state is undercut by the respective retaining portion 17 of a hook element 16. The hook elements 16 are configured such that because of their L-shaped course, autonomous release of the form-fit connection is not possible. The hook elements 16 are configured such that a play exists between the clamping element 13 and the base plate 2, so that in normal state the hook elements 16 do not cooperate with the base plate 2.

Figure 3A:
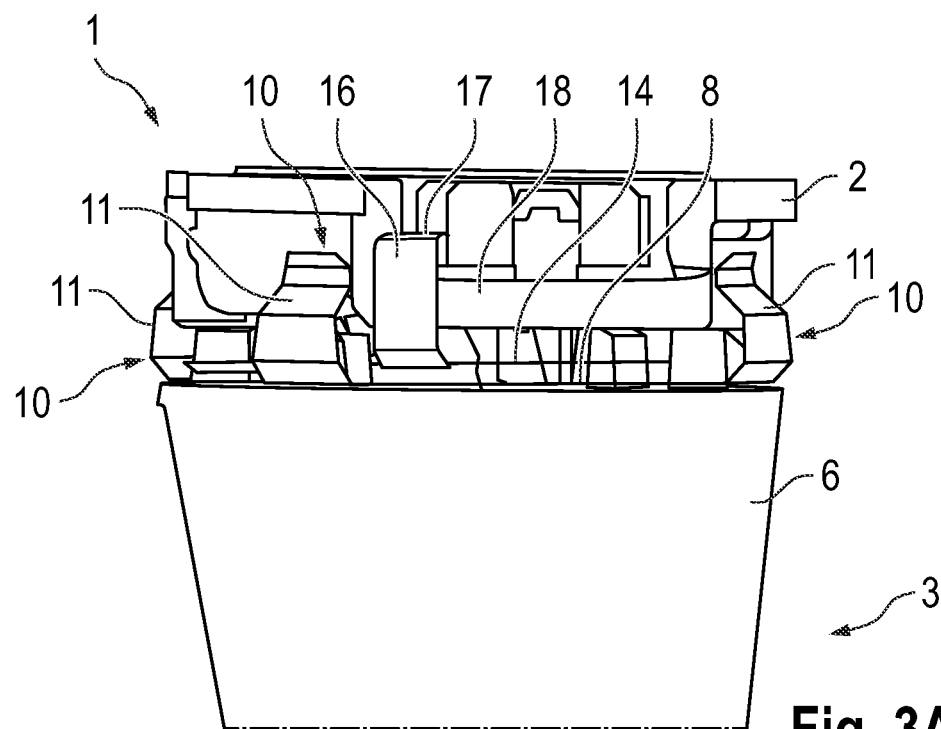
FIGS. 3A and B shows the exemplary arrangement in different states of use.

FIG. 3A here shows a simplified plan view of the arrangement 1 in normal mounted state. The spring elements 10 undercut the associated latching protrusions 12 of the base plate 2, and the holding elements 16 undercut the respective holding protrusion 18 of the base plate 2. In the present exemplary embodiment, the clamping plates 8 and 14 are spaced apart from one another. According to alternative exemplary embodiment not shown here, the clamping plates 8 and 14 lie on or against one another. The retaining portion 17 of the holding elements 16 here lies spaced from the holding protrusion 18 of the base plate 2.

Figure 3B:
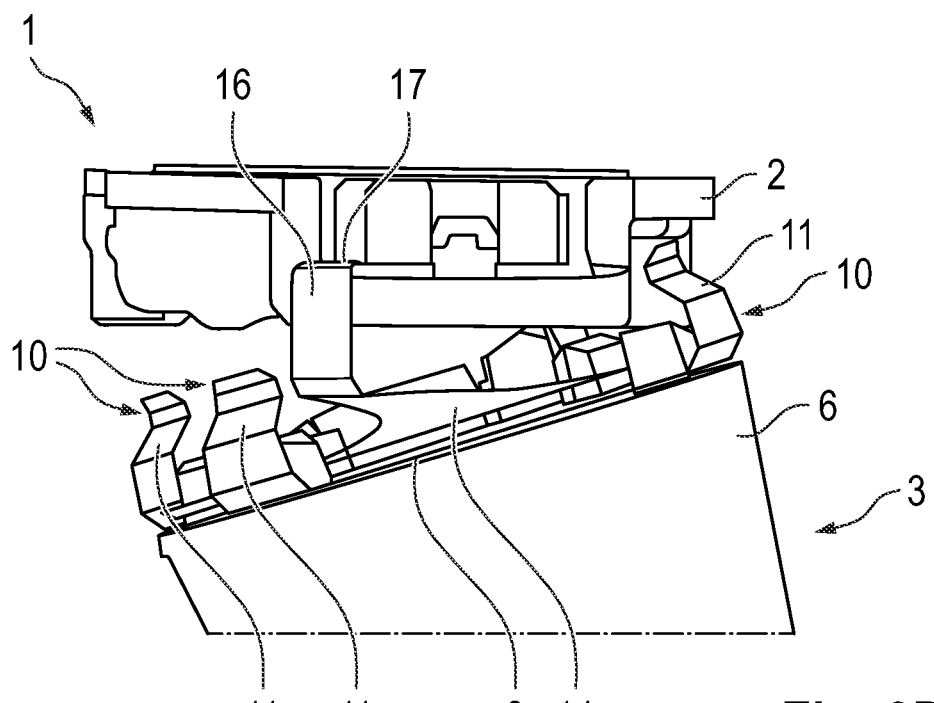

If now a sufficiently large force is exerted on the interior mirror 3, the spring elements 10 may separate from their respective latching protrusion 12, in the released state shown in FIG. 3B. Because of the L-shaped course and the comparatively stiff design of the hook elements 18, these do not however separate from the undercut with the respective holding protrusion 18.

The clamping plate 14 of the clamping element 13 is formed elastically deformable, whereas in contrast to the spring elements 10, the hook elements 16 are relatively stiff. Thus the interior mirror 3 can be pivoted relative to the base plate 2, as shown in FIG. 3B, wherein the clamping element 13 ensures that the interior mirror 3 cannot detach completely from the base plate 2 since the clamping element 13 remains in engagement.

Figure 4:
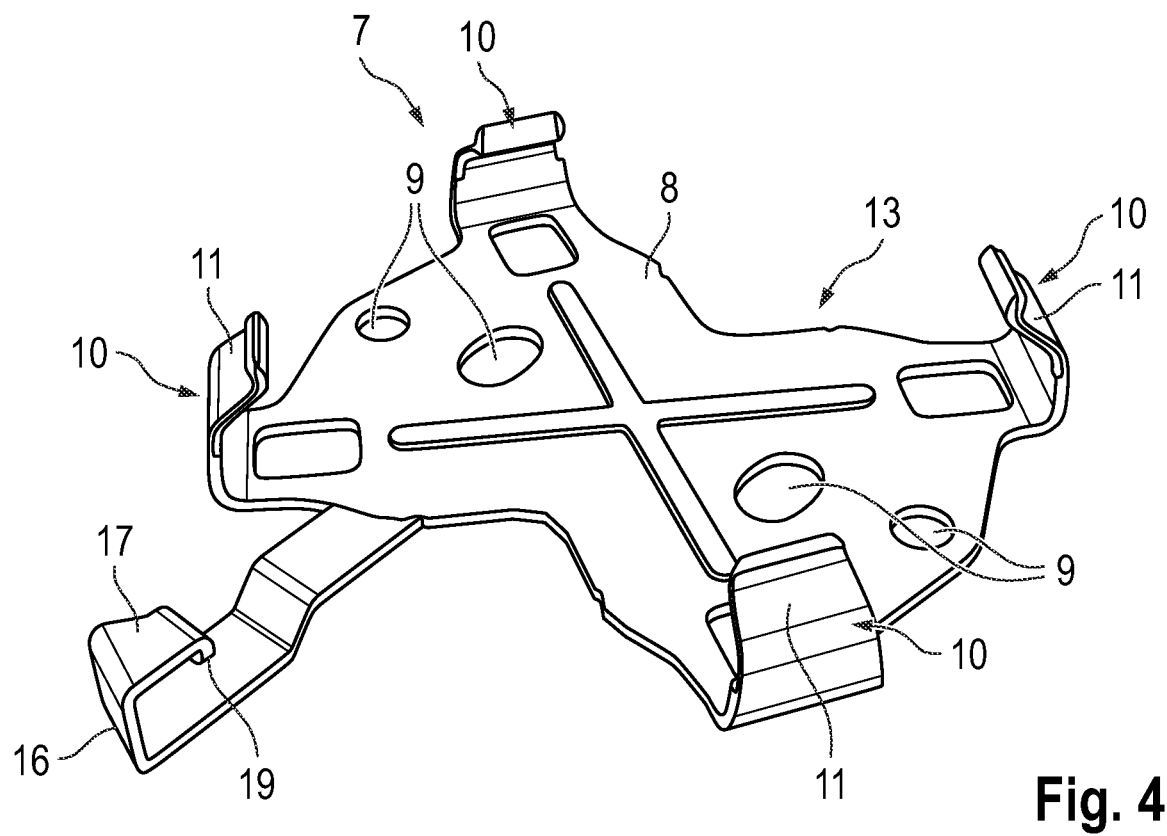
FIG. 4 shows a clamping element of the exemplary arrangement according to a further disclosed embodiment.

FIG. 4 shows a refinement of the arrangement 1 which differs from the preceding exemplary embodiment in that the clamping element 13 is integrated in the first clamping element 7. For this, the clamping element 7 has one of the hook elements 16 in addition to the spring elements 10. The stiffness of the hook element 16 in comparison with the spring elements 10 is increased because the hook element 16 has the above-described L-shaped course, while the spring elements 10, because of the oblique holding portions 11, have more of a V-shaped course. The undercut of the holding protrusion 18 with the respective retaining portion 17, running parallel or almost parallel to the clamping plate 14 or 8, guarantees a secure locking on the base plate 2. Optionally, at its free end, the respective retaining portion 18 has a protrusion 19 which points in the direction of the clamping plate 14 or 8 and engages in a depression of the base plate 2, thus to further hinder the separation of the hook element 16 from the base plate 2.

The invention claimed is:

1. An arrangement for fastening an interior rearview mirror to a transportation vehicle, wherein the interior review mirror has a mirror head and a mirror foot connected together, the arrangement comprising:
   a base plate fixed to the transportation vehicle, wherein the mirror foot is releasably attached to the base plate;
   at least one elastically deformable first clamping element held on the mirror foot on one side and on the base plate on the other side for releasable attachment, wherein the at least one elastically deformable first clamping element is releasable from the base plate and/or from the mirror foot by elastic deformation;
   a second clamping element that is held on the mirror foot on one side and on the base plate on the other side,
   wherein the second clamping element is configured so the at least one elastically deformable first clamping element is completely releasable from the mirror foot or from the base plate under elastic deformation of the at least one elastically deformable first clamping element without release of the second clamping element,
   wherein the at least one elastically deformable first clamping element has a first clamping plate extending between the mirror foot and the base plate, with one or more spring elements arranged on the first clamping plate, wherein each spring element undercuts a respective latching protrusion of the mirror foot or the base plate,
   wherein the second clamping element has one or more hook elements which undercut a holding protrusion of the mirror foot or the base plate, and
   wherein the hook elements are stiff in comparison with the spring elements, so that the hooks cannot be released from the mirror foot or the base plate by an elastic deformation thereof without tools.

2. The arrangement of claim 1, wherein the at least one elastically deformable first clamping element is attached to the mirror foot or to the base plate.

3. The arrangement of claim 1, wherein the second clamping element has a second clamping plate which extends between the base plate and mirror foot and parallel to the at least one elastically deformable first clamping plate, and has the hook element or elements on its outer periphery.

4. The arrangement of claim 3, wherein the hook element or elements are formed integrally with the second clamping plate.

5. The arrangement of claim 1, wherein the hook element or elements are arranged on the at least one elastically deformable first clamping plate and formed integrally therewith.

6. The arrangement of claim 1, wherein the second clamping element is formed elastically deformable in regions.

7. The arrangement of claim 1, wherein the second clamping plate has a higher elasticity than the hook elements.

8. A transportation vehicle comprising the arrangement of claim 1.

* * * * *